(12) United States Patent
Chen et al.

(10) Patent No.: US 8,280,184 B2
(45) Date of Patent: Oct. 2, 2012

(54) IMAGE ENHANCEMENT METHOD AND APPARATUSES UTILIZING THE SAME

(75) Inventors: Shing-Chia Chen, Tainan County (TW); Biing-Seng Wu, Sinshih Township (TW); Lin-Kai Bu, Tainan County (TW); Kuei-Hsiang Chen, Tainan County (TW)

(73) Assignee: Himax Media Solutions, Inc., Sinshih Township, Tainan County (TW)

( * ) Notice: Subject to any disclaimer, the term of this patent is extended or adjusted under 35 U.S.C. 154(b) by 371 days.

(21) Appl. No.: 12/752,270

(22) Filed: Apr. 1, 2010

(65) Prior Publication Data

US 2011/0243473 A1      Oct. 6, 2011

(51) Int. Cl.
*G06K 9/40* (2006.01)
(52) U.S. Cl. .......................................... 382/274
(58) Field of Classification Search .................. 382/274, 382/256, 168, 169; 358/1.9, 3.01, 3.21, 3.24, 358/3.27, 447, 519, 521, 522
See application file for complete search history.

(56) References Cited

U.S. PATENT DOCUMENTS 7,023,580 B2 * 4/2006 Zhang et al. ................... 358/1.9
2010/0053222 A1 * 3/2010 Kerofsky ...................... 345/690
* cited by examiner

*Primary Examiner* — Yon Couso
(74) *Attorney, Agent, or Firm* — Thomas|Kayden

(57) ABSTRACT

An image enhancement apparatus is provided. The image enhancement apparatus includes a global tone mapping curve generator, a local tone mapping curve generator, a reference gamma voltage generator and an image generator. The global tone mapping curve generator generates a global tone mapping curve for an input image according to global characteristic(s) of the input image. The local tone mapping curve generator generates a local tone mapping curve for each image partition within the input image according to the global tone mapping curve and further a feature of the image partition. The reference gamma voltage generator generates a plurality of reference gamma voltages for each image partition according to the corresponding local tone mapping curve for the image partition. The image generator generates an output image according to the reference gamma voltages of the image partitions and the input image.

19 Claims, 24 Drawing Sheets

|  |  |  |
|---|---|---|
| -1 | -1 | -1 |
| -1 | 8 | -1 |
| -1 | -1 | -1 |

FIG. 5a

| $c_{-2}$ | $c_{-1}$ | $c_0$ | $c_1$ | $c_2$ |
|---|---|---|---|---|

FIG. 5b

IMAGE ENHANCEMENT METHOD AND APPARATUSES UTILIZING THE SAME

BACKGROUND OF THE INVENTION

1. Field of the Invention

The invention relates to an image processing method, and more particularly to an image processing method of contrast enhancement.

2. Description of the Related Art

Contrast is the difference in visual properties that makes an object (or its representation in an image) distinguishable from other objects and the background. In visual perception of the real world, contrast is determined by the difference in the color and brightness of the object and other objects within the same field of view. Contrast enhancement is one of the image enhancement techniques used to enhance the contrast presented in an image based on a contrast curve. Global contrast enhancement of an image uniformly adjusts the contrast of each pixel of the image according to a global contrast curve. However, local features are often sacrificed when the features are small with corresponding pixel values not dominating the average pixel value of the image. Local contrast enhancement is another image enhancement technique to divide the image into several local partitions (i.e. blocks) and enhance the contrast of each image partition independently. Local features in each image partition are preserved due to the merit of the locally enhanced contrasts. However, the output image may not be satisfactory due to the lack of a global view of the image.

In addition, complex computations using digital image data cause the number of data bits to increase. However, the flat panel displays (FPDs) have a finite number of input data bits, for example, 6 or 8 bits. To implement a display system based on complex computations, data quantization is indispensable. However, data quantization causes image data degradation.

Therefore, a contrast enhancement method giving consideration to both the global and local characteristics of an image to generate a satisfactory enhancement result is required.

BRIEF SUMMARY OF THE INVENTION

Image enhancement apparatus and image enhancement method are provided. An exemplary embodiment of an image enhancement apparatus comprises a global tone mapping curve generator, a local tone mapping curve generator, a reference gamma voltage generator and an image generator. The global tone mapping curve generator generates a global tone mapping curve for an input image according to global characteristic(s) of the input image. The local tone mapping curve generator generates a local tone mapping curve for each image partition within the input image according to the global tone mapping curve and further generates a feature of the image partition. The reference gamma voltage generator generates a plurality of reference gamma voltages for each image partition according to the corresponding local tone mapping curve for the image partition. The image generator generates an output image according to the reference gamma voltages of the image partitions and the input image.

An exemplary embodiment of an image enhancement method comprising: generating a global tone mapping curve for an input image according to global characteristic(s) of the input image; generating a local tone mapping curve for each image partition within the input image according to the global tone mapping curve and further a feature of the image partition; generating a plurality of reference gamma voltages for each image partition according to the corresponding local tone mapping curve for the image partition; and generating an output image according to the reference gamma voltages of the image partitions and the input image.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 5a shows an exemplary 2-D high pass filter according to an embodiment of the invention;

FIG. 5b shows an exemplary 1-D filter with a window length of 5 pixels according to another embodiment of the invention.

FIG. 6b shows the obtained feature value of each image partition of the input image shown in FIG. 6a;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
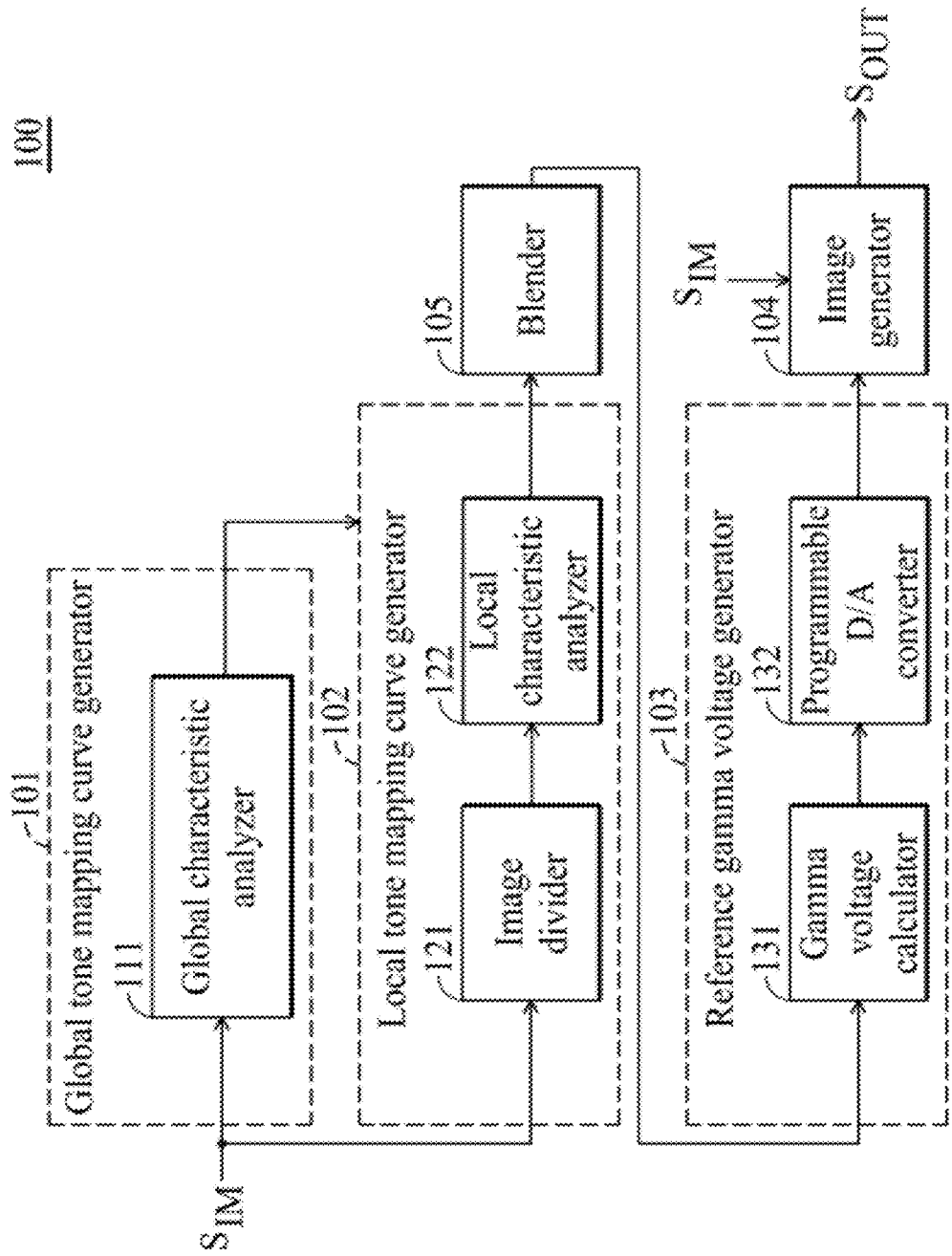
FIG. 1 is a block diagram of an image processing apparatus according to an embodiment of the invention.

FIG. 1 is a block diagram of an image processing apparatus according to an embodiment of the invention. The image processing apparatus 100 comprises a global tone mapping curve generator 101, a local tone mapping curve generator 102, a reference gamma voltage generator 103 and an image generator 104. The global tone mapping curve generator 101 is arranged to receive an input image $S_{IM}$ and generate a global tone mapping curve for the input image $S_{IM}$ according to global characteristic(s) of the input image. The local tone mapping curve generator 102 is arranged to receive the input image $S_{IM}$, generates a local tone mapping curve for each image partition within the input image $S_{IM}$ according to the global tone mapping curve and further a feature of the image partition. The reference gamma voltage generator 103 is arranged to generate a plurality of reference gamma voltages for each image partition according to the corresponding local tone mapping curve for the image partition. The image generator 104 is arranged to enhance the input image $S_{IM}$ to generate an output image $S_{OUT}$ according to the reference gamma voltages of the image partitions and the input image.

Figure 2:
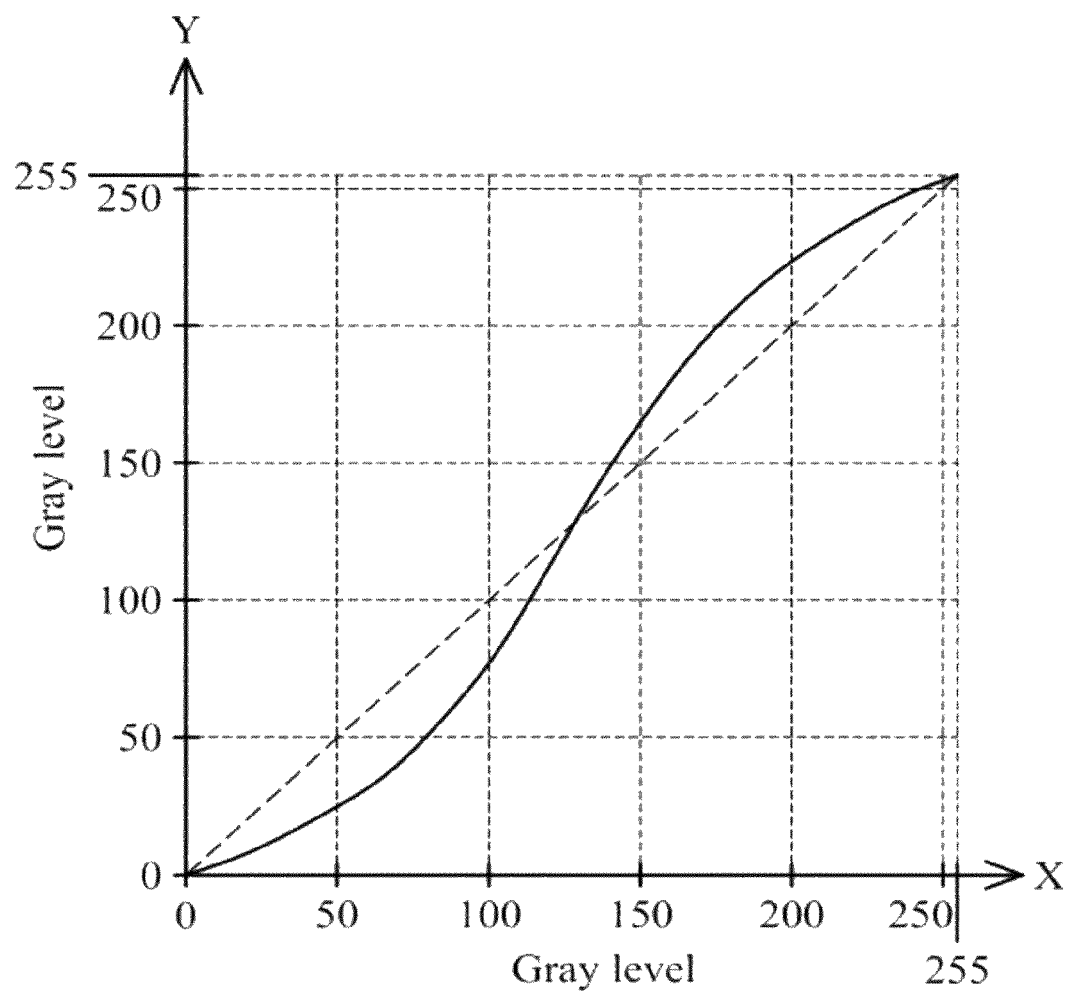
FIG. 2 shows an exemplary tone mapping curve according to an embodiment of the invention.
Figure 3A:
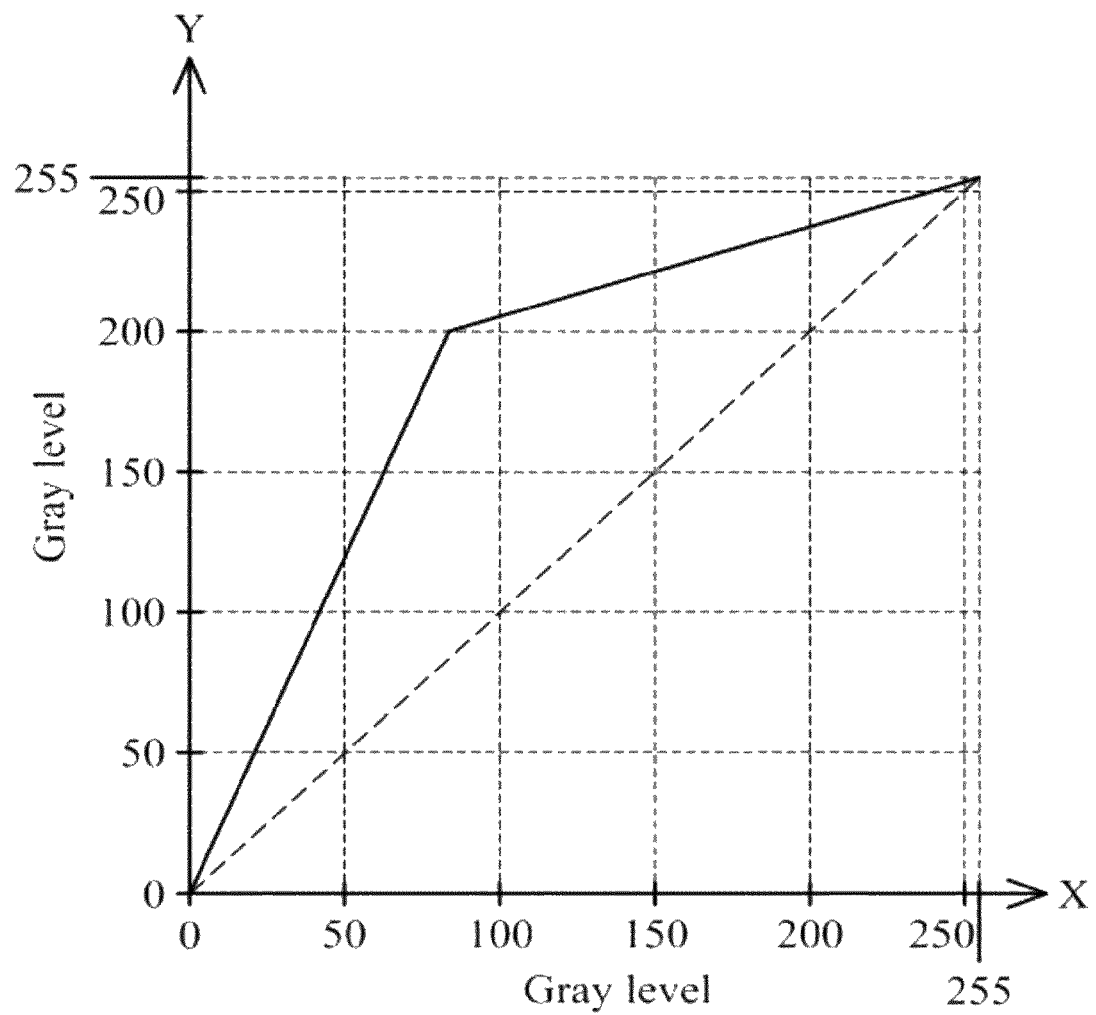
FIG. 3a shows another exemplary tone mapping curve according to another embodiment of the invention.
Figure 3B:
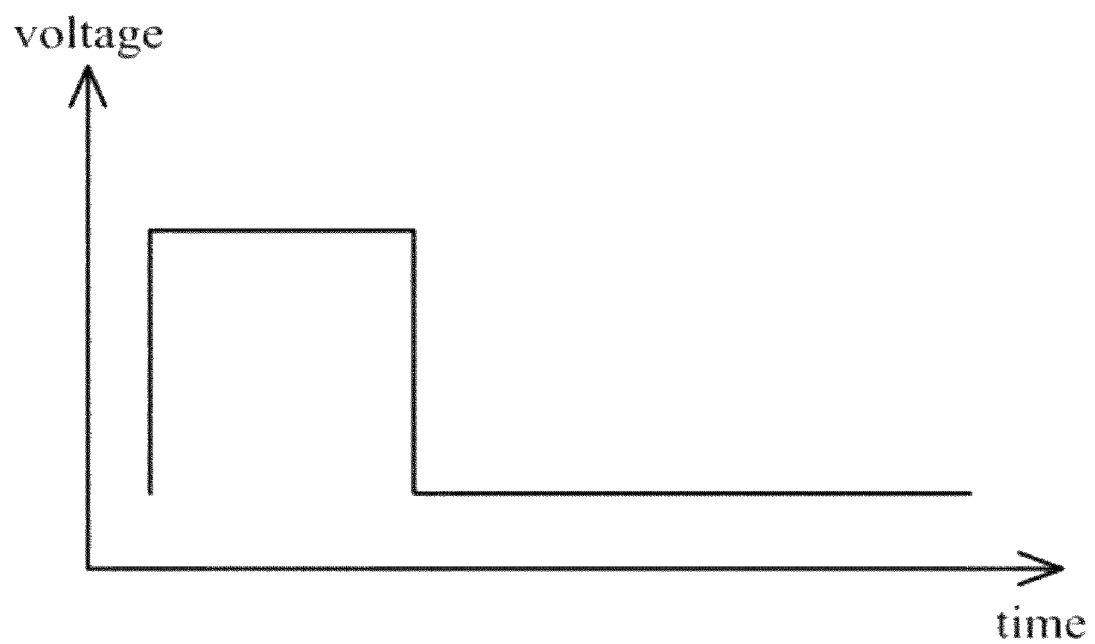
FIG. 3b shows an exemplary backlight duty cycle curve according to an embodiment of the invention.

According to the embodiments of the invention, the tone mapping curve is a curve revealing the pixel value to pixel value mapping relationship for image processing, such as contract or backlight enhancement. FIG. 2 shows an exemplary tone mapping curve, which is also called an S-shaped characteristic curve or an S-curve for contrast enhancement, according to an embodiment of the invention. The X-axis represents the input pixel value and the Y-axis represents the output pixel value. Based on the S-curve, the pixel values of the input image may be adjusted according to the X-Y relationship described by the S-curve, thereby adjusting the contrast of the input image and therefore the output image may be enhanced. FIG. 3a shows another exemplary tone mapping curve according to another embodiment of the invention. The tone mapping curve shown in FIG. 3a may be obtained according to a corresponding backlight duty cycle curve as shown in FIG. 3b. The backlight duty cycle curve shown in FIG. 3b may be obtained according to, for example, an average brightness of the input image, and indicates that the duty cycle (i.e. the high voltage portion) for the backlight of the panel should turn on. Generally, the shorter the backlight duty cycle is, the larger the curvature of the tone mapping curve shown in FIG. 3a should be, thereby compensating for the dark backlight effect of the panel through pixel value adjustment according to the X-Y relationship described by the tone mapping curve as shown in FIG. 3a.

Referring back to FIG. 1, according to the embodiment of the invention, the global tone mapping curve generator 101 further comprises a global characteristic analyzer 111 analyzing the input image $S_{IM}$ to obtain the global characteristic(s). The global characteristic(s) may be a global histogram and/or a backlight duty cycle (as shown in FIG. 3b) of the input image $S_{IM}$. A histogram utilized in the image processing scope is a statistic table representing the pixel value (e.g. gray level) versus a corresponding amount of pixels within the image. The histogram having the X-axis for the pixel value and the Y-axis for the number of the pixel value exhibits a pixel value distribution of the corresponding image.

According to an embodiment of the invention, the global tone mapping curve generator 101 is arranged to generate a global tone mapping curve of the input image, such as the one shown in FIG. 2 or FIG. 3a, according to the global histogram or the global backlight duty cycle. To be more specific, according to an embodiment of the invention, the global tone mapping curve generator 101 may generate the global tone mapping curve of the input image as shown in FIG. 2 by performing histogram equalization, or generate the global tone mapping curve of the input image as shown in FIG. 3a according to the corresponding black duty cycle curve (as shown in FIG. 3b) by using the one to one mapping relationship there between.

Figure 4:
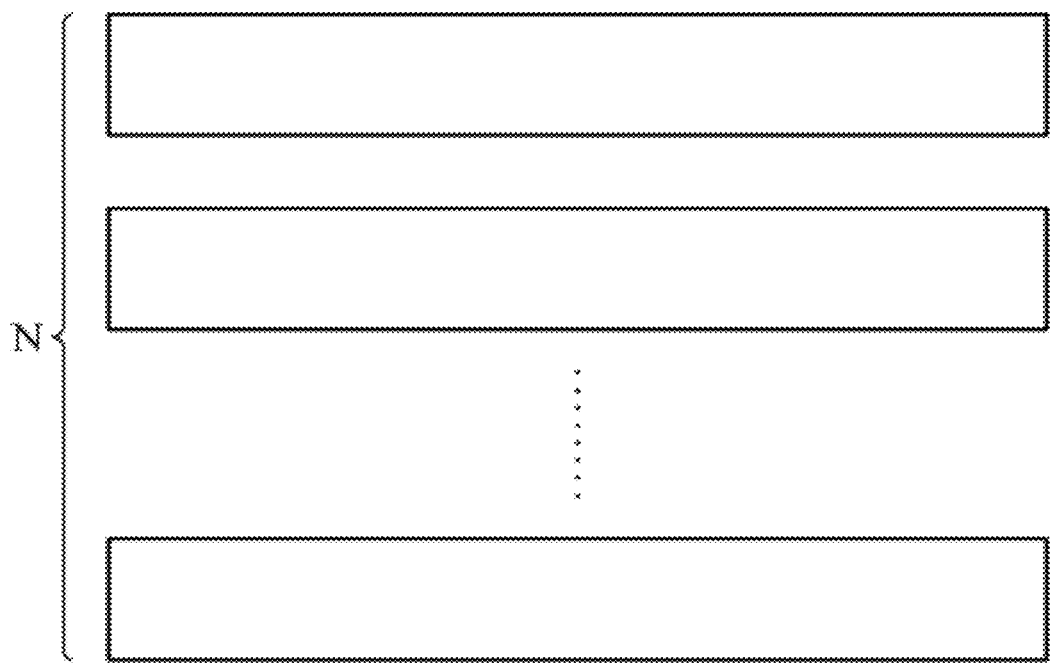
FIG. 4 shows exemplary image partitions according to an embodiment of the invention.
Figures 5A, 5B:
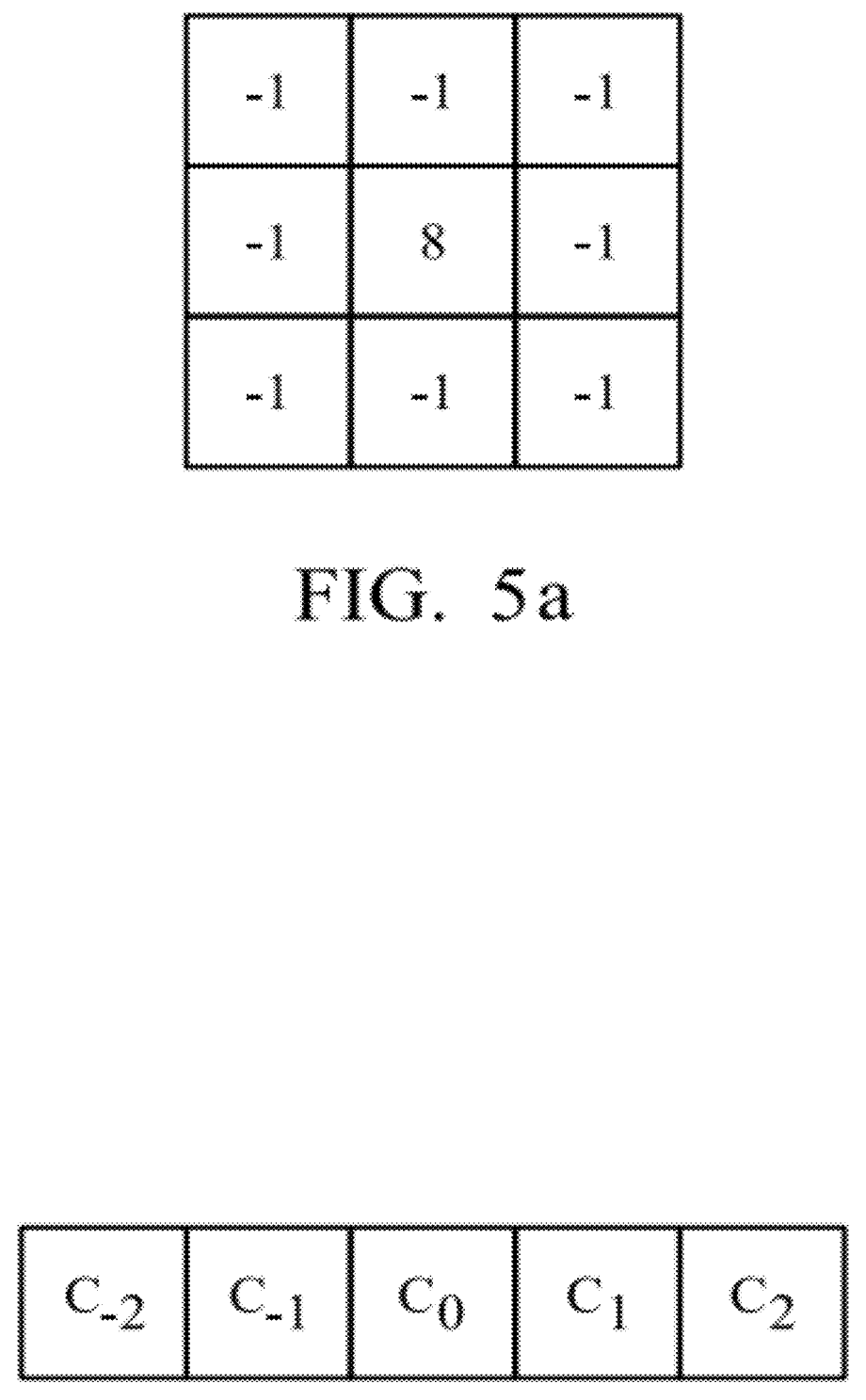

The local tone mapping curve generator 102 comprises an image divider 121 and a local characteristic analyzer 122. The image divider 121 is arranged to divide the input image $S_{IM}$ into several smaller image partitions (i.e. image blocks). FIG. 4 shows exemplary image partitions according to an embodiment of the invention. As shown in FIG. 4, the input image is divided into N image partitions. The local characteristic analyzer 122 is arranged to filter the image partitions by using a predetermined filter to obtain a feature value for each image partition. According to an embodiment of the invention, the predetermined filter may be a high pass filter. FIG. 5a shows an exemplary 2-D high pass filter according to an embodiment of the invention. FIG. 5b shows an exemplary 1-D filter with a window length of 5 pixels according to another embodiment of the invention. Pixel values of the pixels within the window may be multiplied by the coefficients $C_0, C_{-1}, C_1, C_{-2}$ and $C_2$ and a summation of the multiplication results may be obtained as the filtered value of the central pixel. The same filter operation may also be applied to the 2-D filter as shown in FIG. 5a and the invention should not be limited thereto.

Figure 6A:
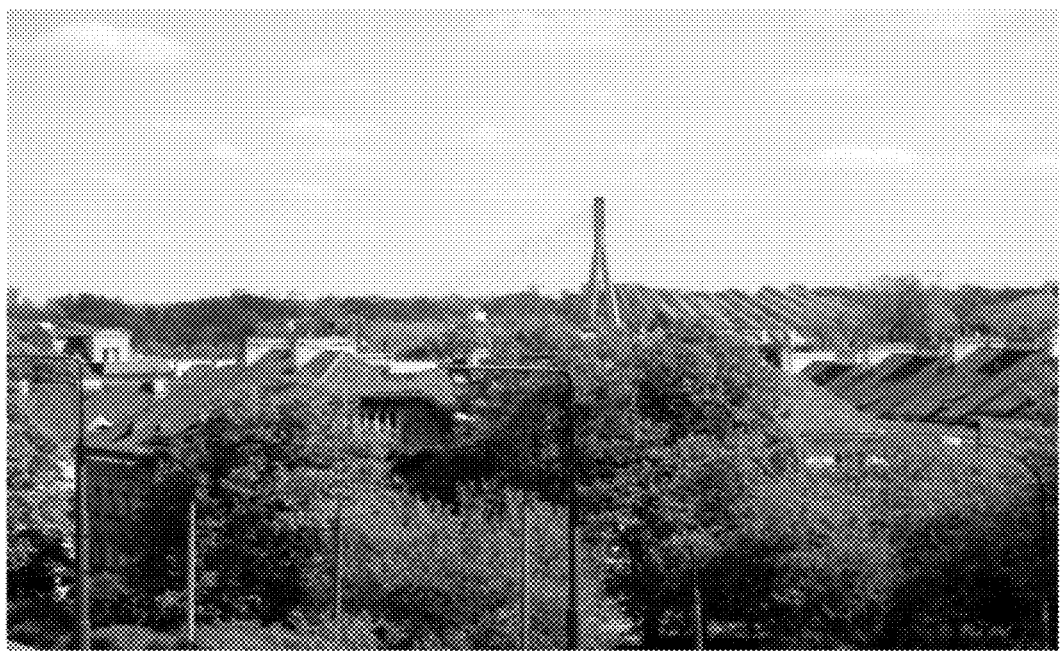
FIG. 6a shows an exemplary input image according to an embodiment of the invention.
Figure 6B:
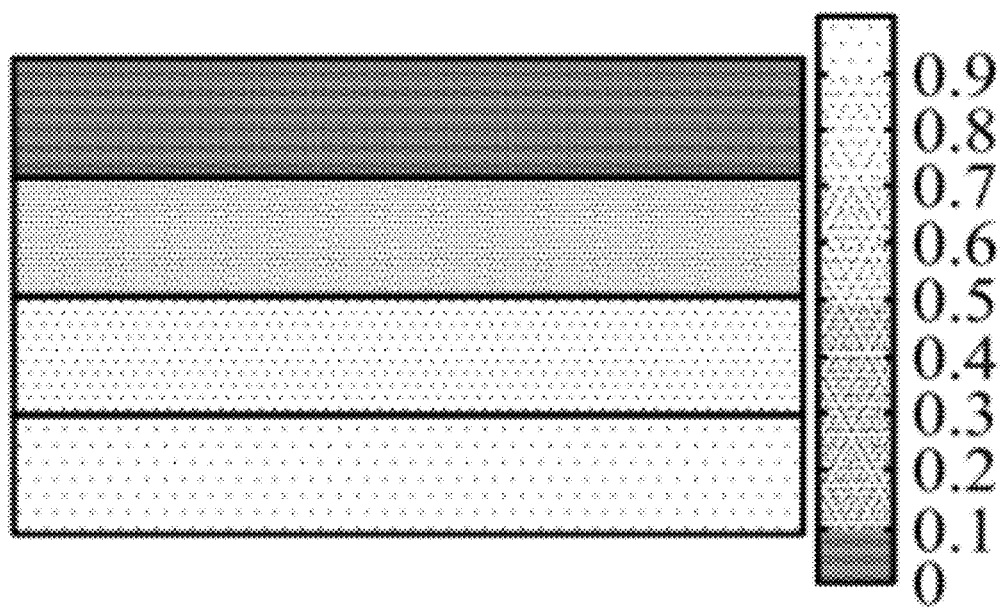

According to an embodiment of the invention, the local characteristic analyzer 122 may obtain the filtered value of each pixel within an image partition by filtering the pixel with the predetermined filter, and obtain the feature value of the image partition according to the obtained filtered value of each pixel within the image partition. As an example, the feature value of the image partition is to sum up the filtered values of the pixels within the image partition. In the embodiments of the invention, the purpose of the local characteristic analysis is to calculate the number of details in the local image partitions. FIG. 6a shows an exemplary input image according to an embodiment of the invention. As shown in FIG. 6a, in contrast to the lower half of the input image, the upper half of the input image is the sky with less details and edges. FIG. 6b shows the obtained feature value of each image partition of the input image shown in FIG. 6a. According to the embodiments of the invention, the input image as shown in FIG. 6a is equally divided into four image partitions for simplicity and the feature values may be normalized and distributed within 0~1. A smaller feature value may represent that there are fewer details or edges in the corresponding image partition.

After obtaining the feature value of the image partitions, the local tone mapping curve generator 102 may generate a local tone mapping curve for each image partition according to the corresponding feature value of the image partition and the global tone mapping curve. According to an embodiment of the invention, the local tone mapping curve generator 102 may generate the local tone mapping curves of the image partitions by adjusting a curvature of the global tone mapping curve according to the corresponding feature values. Referring back to FIG. 2, FIG. 3a and FIG. 6b, in some embodiments of the invention, the local tone mapping curve generator 102 may adjust the curvature of the global tone mapping curve shown in FIG. 2 and/or FIG. 3a respectively according to the normalized feature values of image partitions shown in FIG. 6b so as to generate a local tone mapping curve for each image partition. As an example, the global tone mapping curve may be regarded to have a maximum curvature. For each image partition, the local tone mapping curve generator 102 may reduce the curvature of the global tone mapping curve according to the normalized feature value of the image partition. The smaller feature value represents the larger reduction of the curvature to be taken. In other words, the obtained curvature of the local image partition may be close to the curvature of the global tone mapping curve (the maximum curvature) when the normalized feature value gets closer to the value of one.

Figure 7A:
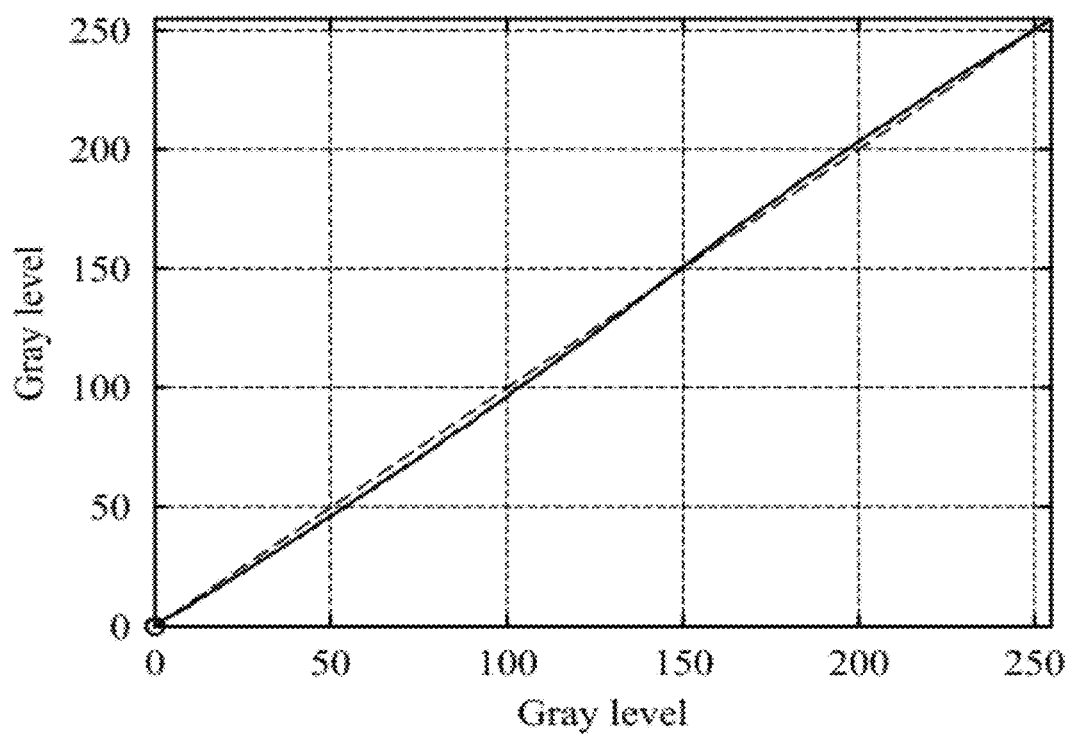
FIGS. 7a-7d shows four local contrast curves according to an embodiment of the invention.
Figure 7B:
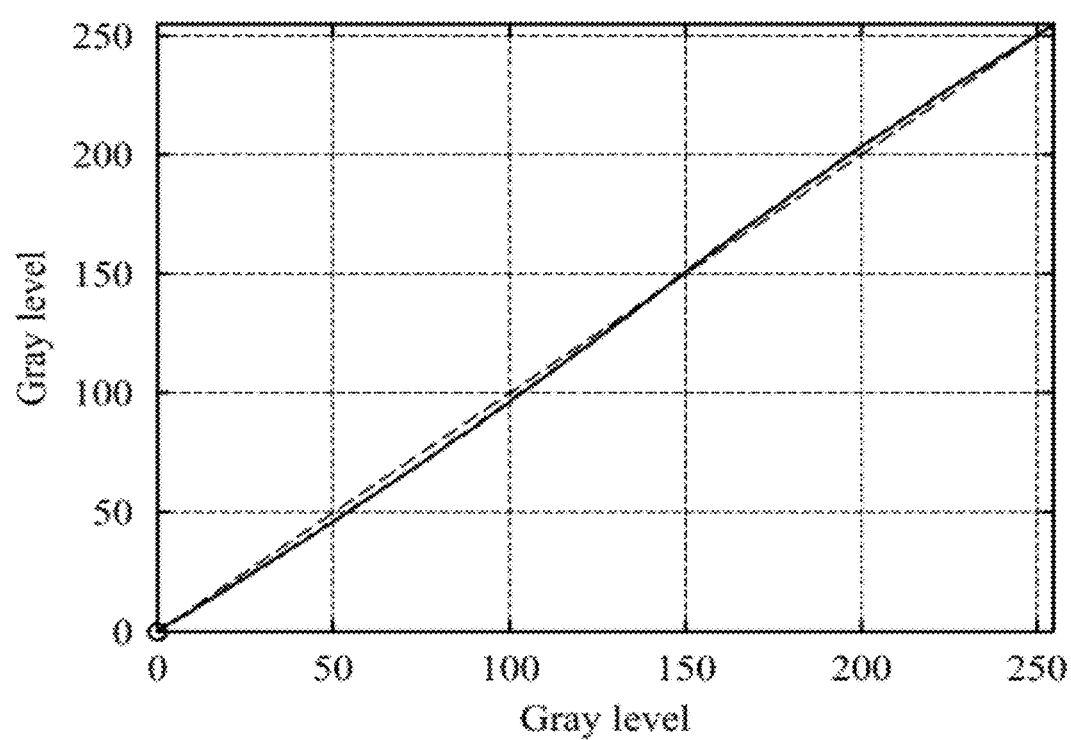
Figure 7C:
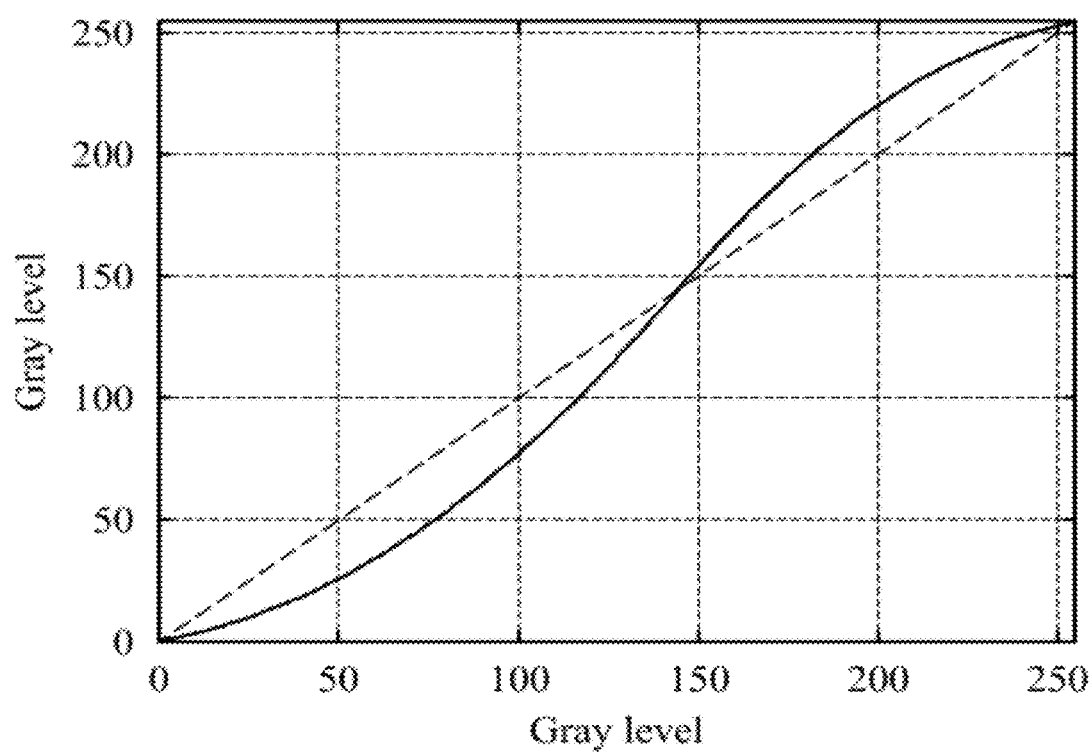
Figure 7D:
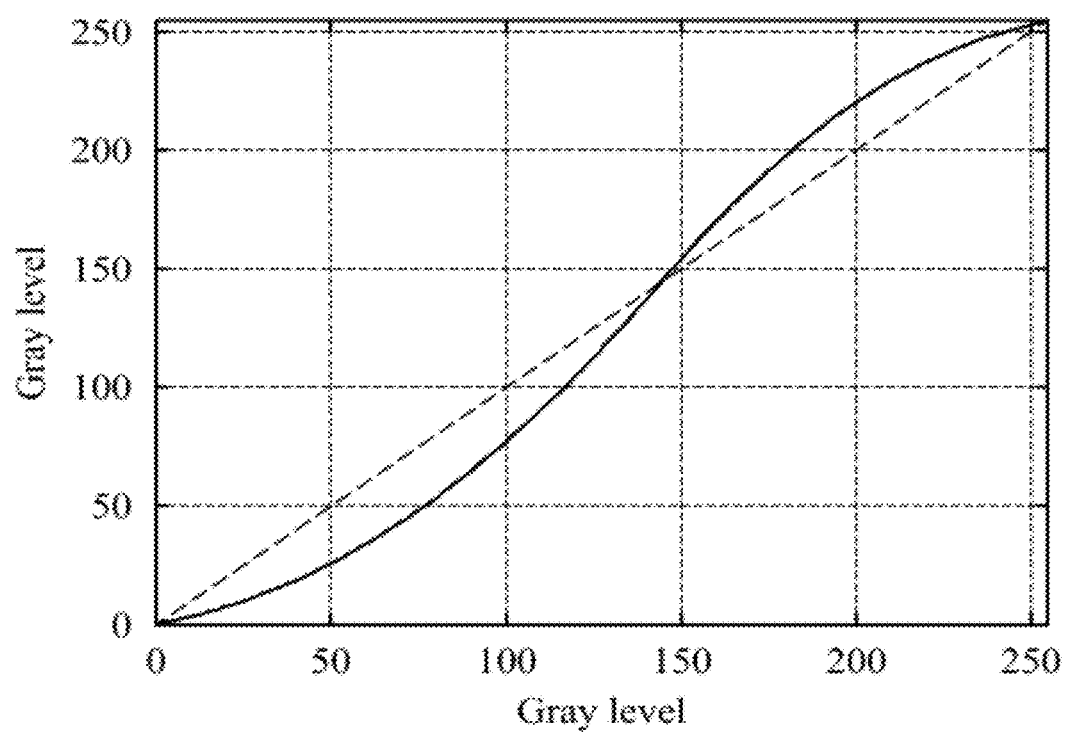
Figure 10:
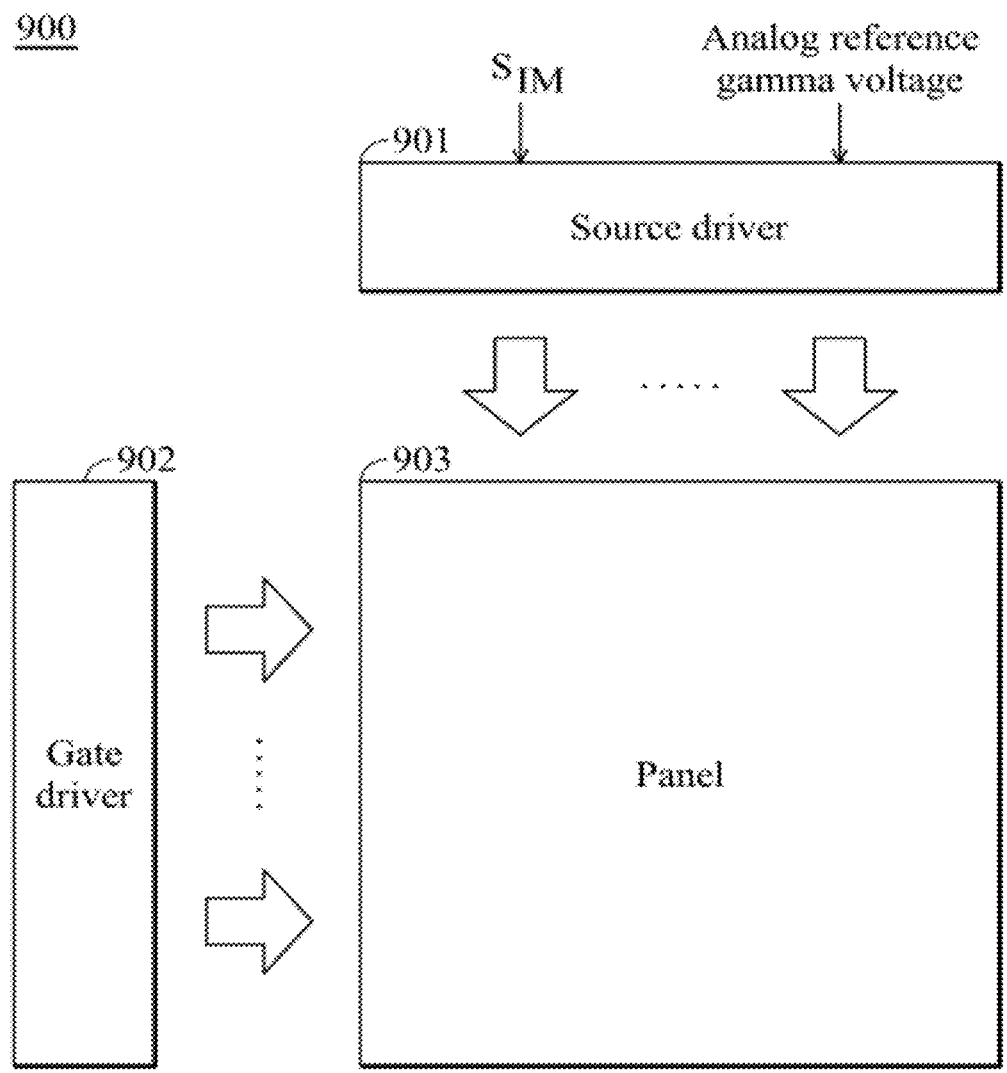
FIG. 10 shows an image display apparatus according to an embodiment of the invention.

Take the global contrast curve (S-curve) as shown in FIG. 2 as an example, FIGS. 7a-7d shows four local contrast curves according to an embodiment of the invention. In this embodiment, the input image as shown in FIG. 6a is equally divided into four image partitions for simplicity. Note that according to an embodiment of the invention, the image divider 121 divides the input image $S_{IM}$ along a row direction (i.e. the scan line direction of a panel 903 as shown in FIG. 10 for displaying the output image $S_{OUT}$) of pixels of the input image $S_{IM}$ as shown in FIG. 4. Referring to FIG. 6b, the feature values of the image partitions located in the first and second image partitions (counted from top to bottom) of the input image are close to zero and the feature values of the third and fourth image partitions of the input image are close to one. The local contrast curves in FIGS. 7a-7d are obtained respectively according to the feature values as shown in FIG. 6b. FIG. 7a shows the local contrast curve of the first image partition of the input image. FIG. 7b shows the local contrast curve of the second image partition of the input image. FIG. 7c shows the local contrast curve of the third image partition of the input image. FIG. 7d shows the local contrast curve of the fourth image partition of the input image. Therefore, the four local contrast curves shown in FIGS. 7a to 7d respectively show the obtained curvatures of the local contrast curves of the corresponding image partitions. As shown FIGS. 7c and 7d, the obtained curvatures of the local contrast curves of the image partitions located in the lower half (i.e. the third and fourth image partitions) of the input image may be larger than those of the image partitions located in the upper half of the input image as shown FIGS. 7a and 7b. Therefore, the contrasts of the image partitions located in the lower half with more details may be given more enhancement than the contrasts of the image partitions located in the upper half with fewer details.

Figure 8A:
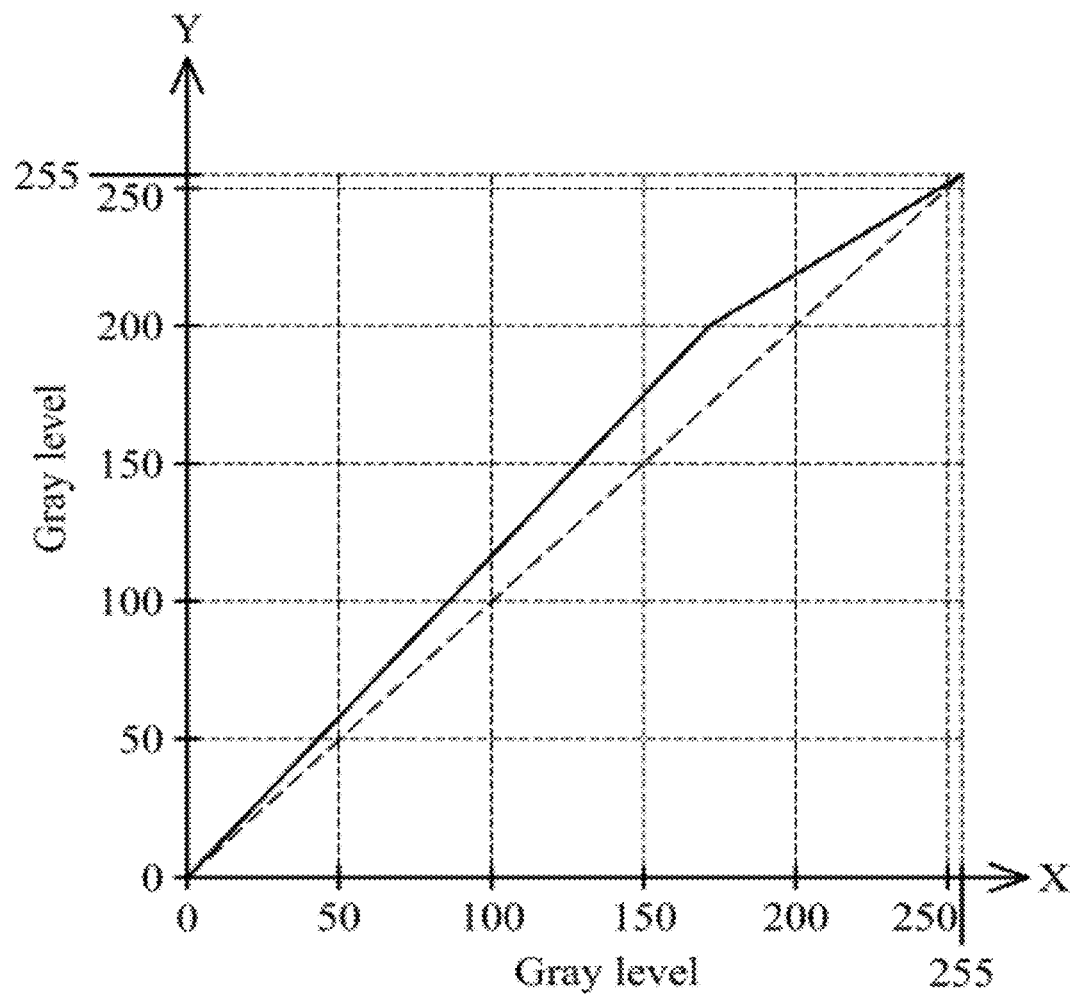
FIGS. 8a-8d shows four local tone mapping curves according to another embodiment of the invention.
Figure 8B:
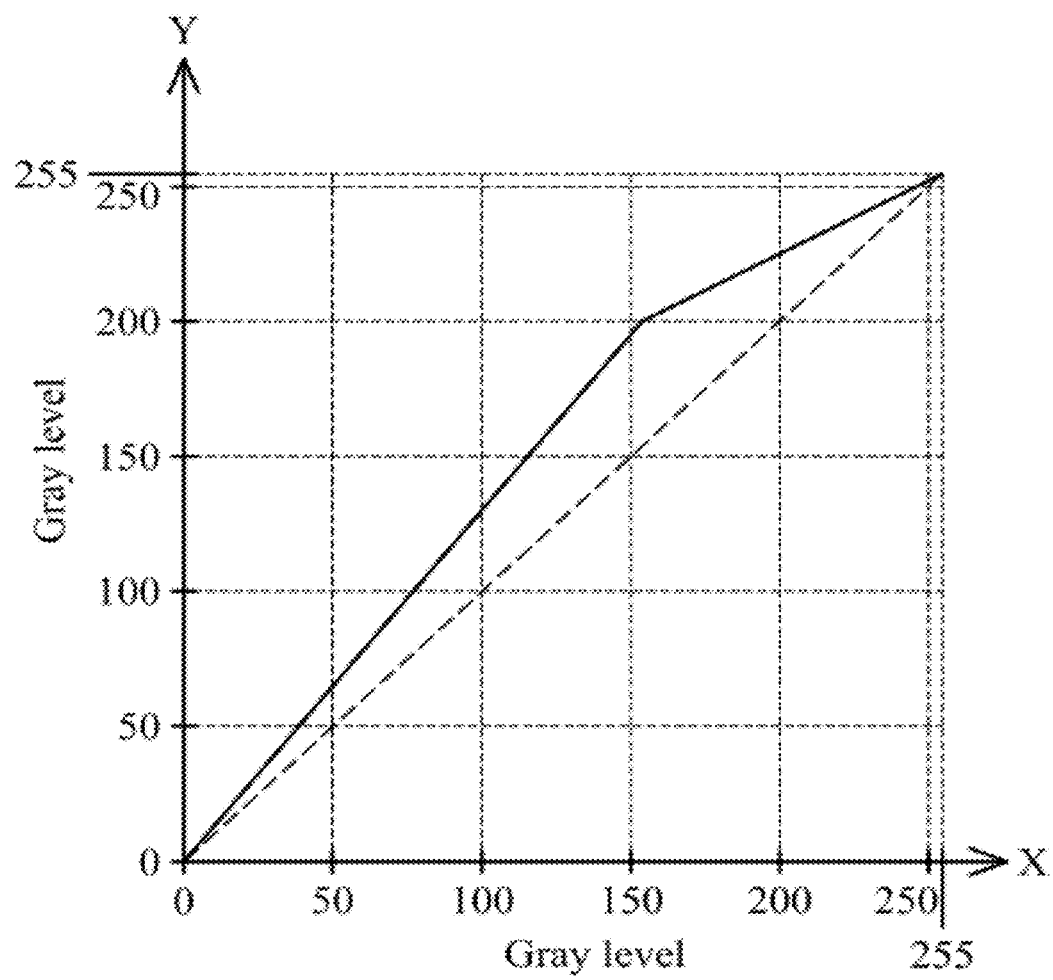
Figure 8C:
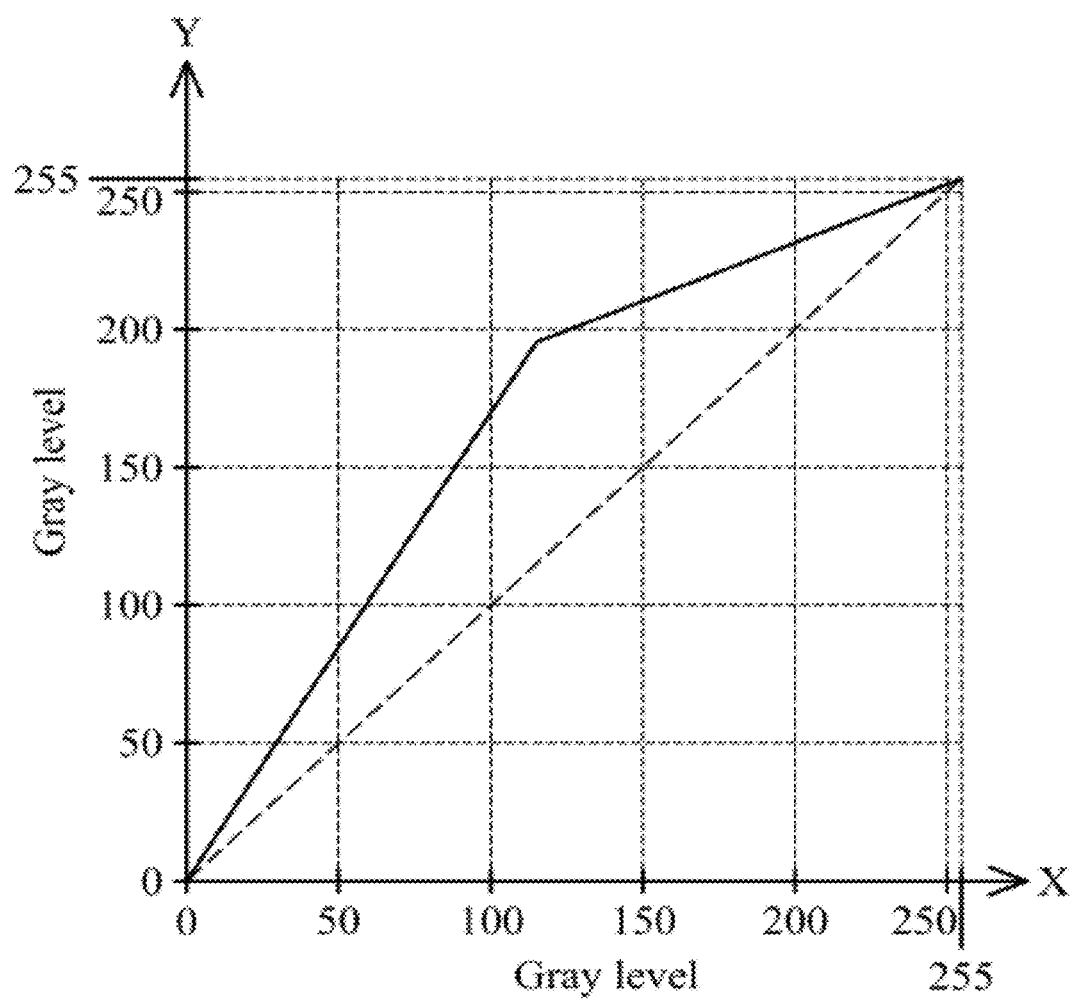
Figure 8D:
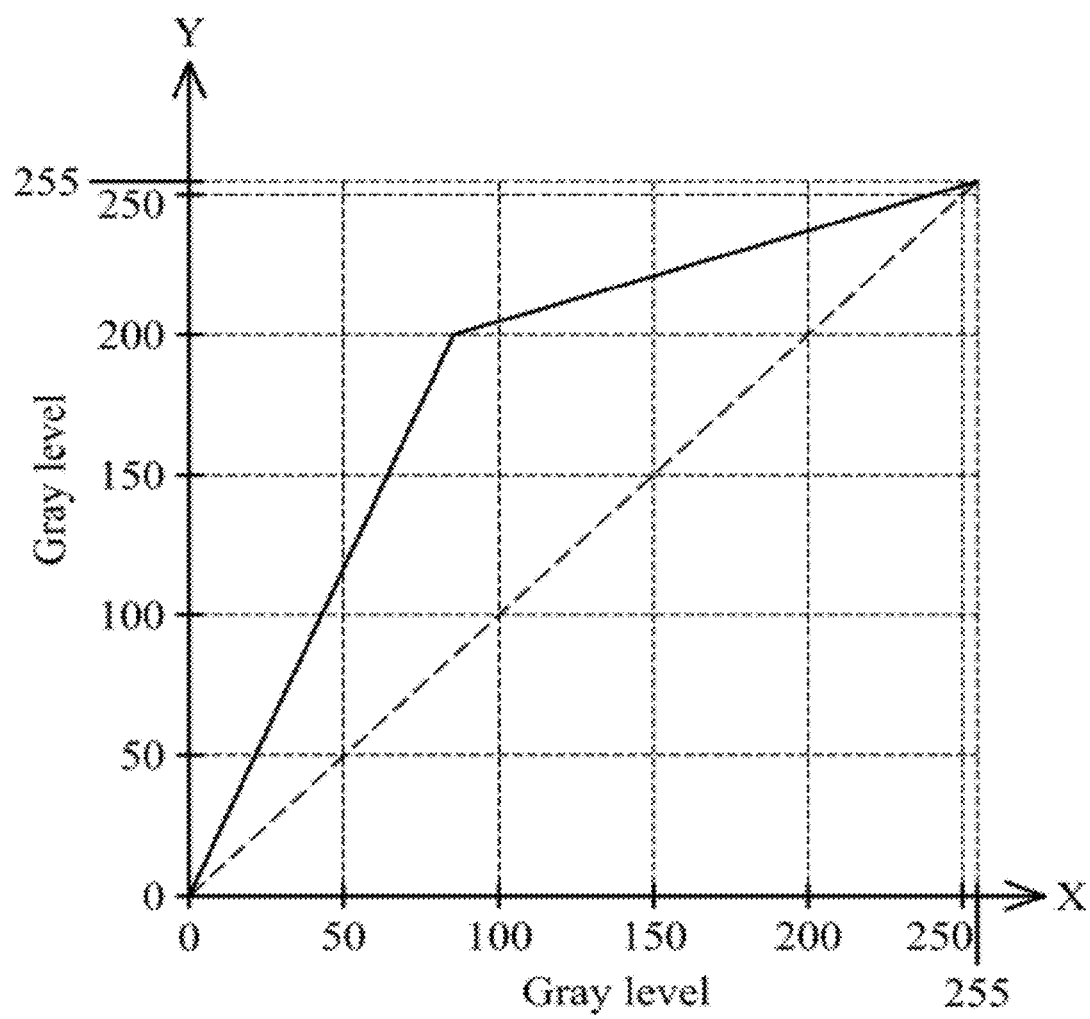

Note that the concept of generating the local contrast curve as described above may also be applied in generating other types of local tone mapping curves and the invention is not limited thereto. FIGS. 8a-8d shows four local tone mapping curves according to another embodiment of the invention. The local tone mapping curves in FIGS. 8a-8d are obtained respectively according to the global tone mapping curve as shown in FIG. 3a (or the backlight duty cycle curve as shown in FIG. 3b) and the feature values as shown in FIG. 6b. FIG. 8a shows the local tone mapping curve of the first image partition of the input image. FIG. 8b shows the local tone mapping curve of the second image partition of the input image. FIG. 8c shows the local tone mapping curve of the third image partition of the input image. FIG. 8d shows the local tone mapping curve of the fourth image partition of the input image. As shown FIGS. 8c and 8d, the obtained curvatures of the local tone mapping curves of the image partitions located in the lower half (i.e. the third and fourth image partitions) of the input image may be larger than those of the image partitions located in the upper half of the input image as shown FIGS. 8a and 8b. Therefore, the contrasts of the image partitions located in the lower half with more details may be given more enhancement than the contrasts of the image partitions located in the upper half with fewer details.

Note that the reduction of curvature as described above is just one of the embodiments of the invention and the invention is not limited thereto. Those who are skilled in this technology can still make various alterations and modifications without departing from the scope and spirit of this invention to achieve a substantially similar concept or the same function of the invention. Therefore, the scope of the present invention shall be defined and protected by the following claims and their equivalents.

Figure 9:
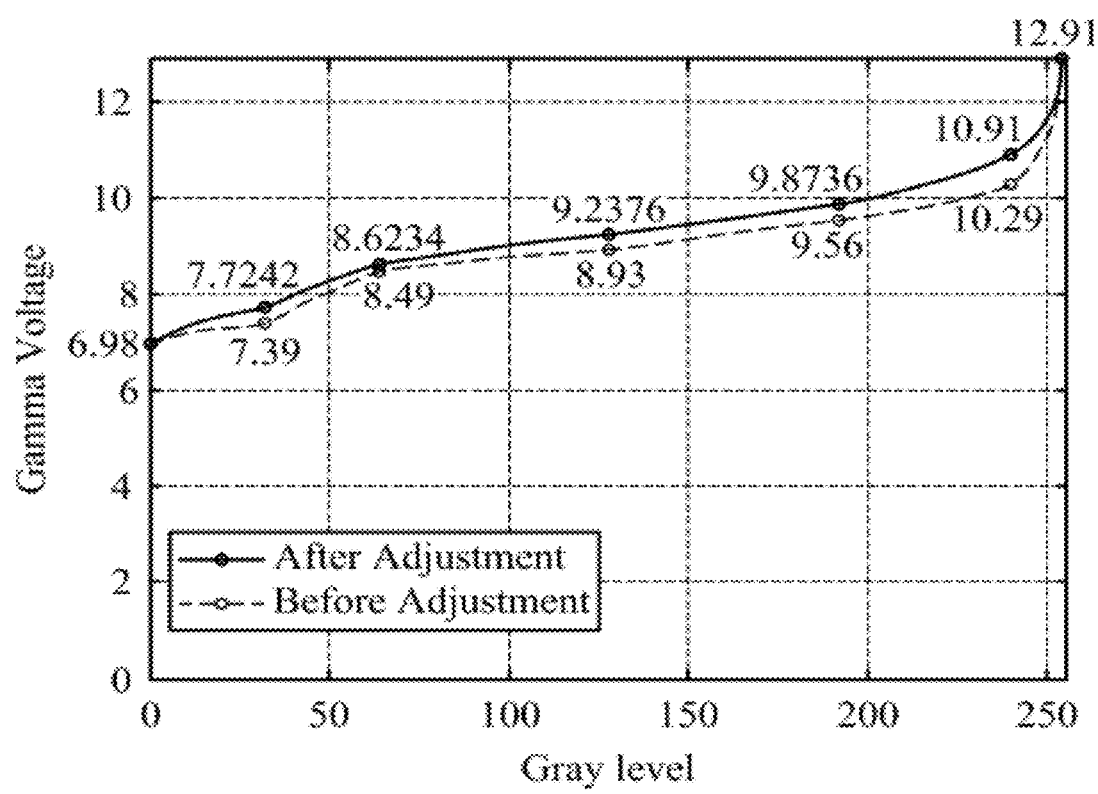
FIG. 9 shows an exemplary pixel value versus gamma voltage curve according to an embodiment of the invention.

Referring back to FIG. 1, according to an embodiment of the invention, the reference gamma voltage generator 103 comprises a gamma voltage calculator 131 and a programmable D/A converter 132. The gamma voltage calculator 131 obtains a plurality of reference gamma voltages for each image partition according to the corresponding local tone mapping curve for the image partition received from the local tone mapping curve generator 102. FIG. 9 shows an exemplary pixel value versus gamma voltage curve according to an embodiment of the invention. The gamma voltage is a voltage generated which corresponds to the pixel value for driving the liquid crystal to display the image accordingly. The reference gamma voltages may include the gamma voltages for specific reference pixel values, such as 32, 64, 128, 192 . . . etc as shown in FIG. 9. According to an embodiment of the invention, the gamma voltage calculator 131 may obtain an original pixel value versus gamma voltage curve (such as the curve of before adjustment shown in FIG. 9) in advance. As an example, the gamma voltage calculator 131 may build up a table comprising information regarding the pixel value versus and their corresponding gamma voltages. After obtaining the local tone mapping curve from the local tone mapping curve generator 102, the gamma voltage calculator 131 transfers the original reference gamma voltages to the plurality of reference gamma voltages (as shown in the curve of after adjustment in FIG. 9) for each image partition according to the corresponding local tone mapping curve for the image partition.

To be more specific, as an example shown in FIG. 9, when a local tone mapping curve indicates that an input pixel value of 128 should be adjusted to 160 for contrast enhancement, the adjustment in pixel value may be transferred to the adjustment in gamma voltages. In the example, the gamma voltage calculator 131 transfers the original reference gamma voltage 8.96V corresponding to the pixel value 128 to 9.2376V corresponding to the pixel value 160 according to the pixel value versus gamma voltage curve before adjustment. Therefore, the adjusted gamma voltages for the reference pixel values (i.e. the reference gamma voltages) may be obtained accordingly. Note that according to the embodiments of the invention, in order to avoid image data degradation due to data quantization as previously described, the programmable D/A converter 131 further converts the plurality of reference gamma voltages to a plurality of analog reference gamma voltages represented in an analog manner. Next, the image generator 104 may further interpolate the plurality of analog reference gamma voltages in analog domain to obtain the gamma voltages for each pixel in each image partition or obtain a pixel value versus gamma voltage curve for each image partition, and generate the output image $S_{OUT}$ according to the gamma voltages or the pixel value versus gamma voltage curve of the image partitions and the input image. As an example, the image generator 104 may interpolate the gamma voltages of the pixel values distributed between pixel values 32 and 64 according to the analog reference gamma voltages corresponding to the pixel values 32 and 64, thereby obtaining the gamma voltages of the pixel values distributed between pixel values 32 and 64, or the pixel value versus gamma voltage curve such as the after adjustment curve shown in FIG. 9. According to the embodiments of the invention, because the adjustment in pixel value for image enhancement is transferred to the adjustment in gamma voltages, and most of the gamma voltages are obtained by interpolating in analog domain according to the analog reference gamma voltages, the accuracy of the gamma voltage control is no more limited by the data quantization in digital domain, and the problem of image data degradation can therefore be greatly improved.

According to an embodiment of the invention, the image generator 104 may be a source driver for driving the display of the output image $S_{OUT}$. FIG. 10 shows an image display apparatus according to an embodiment of the invention. The image display apparatus 900 comprises a source driver 901, a gate driver 902 and a panel 903. The source driver 901 receives the image data $S_{IM}$ and the analog reference gamma voltages from the image processing apparatus 100, obtains the analog gamma voltages for each pixel of the image data $S_{IM}$ by interpolating the received analog reference gamma voltages, and outputs the analog gamma voltages so as to drive the panel to display the image data. The gate driver 902 outputs a plurality of scan signals to drive (i.e. turn on) the liquid crystals in each scan line of the panel 903.

According to another embodiment of the invention, the image processing apparatus 100 may further comprise a blender 105. The blender 105 receives the local tone mapping curves of the image partitions from the local tone mapping curve generator 102 and, for each row (or scan line) of pixels of the input image $S_{IM}$, the blender 105 is arranged to blend the local tone mapping curves of the image partition having the row of pixels and image partitions adjacent to the row of pixels to obtain a dedicated tone mapping curve for that row of pixels. According to an embodiment of the invention, the blender 105 obtains the dedicated tone mapping curve by blending the local tone mapping curves of the image partition and the image partitions adjacent to the row of pixels with a plurality of weightings. The weighting of the image partition or each adjacent image partition may be determined according to a distance between the row of pixels and the image partition or the corresponding adjacent image partition.

Figure 11:
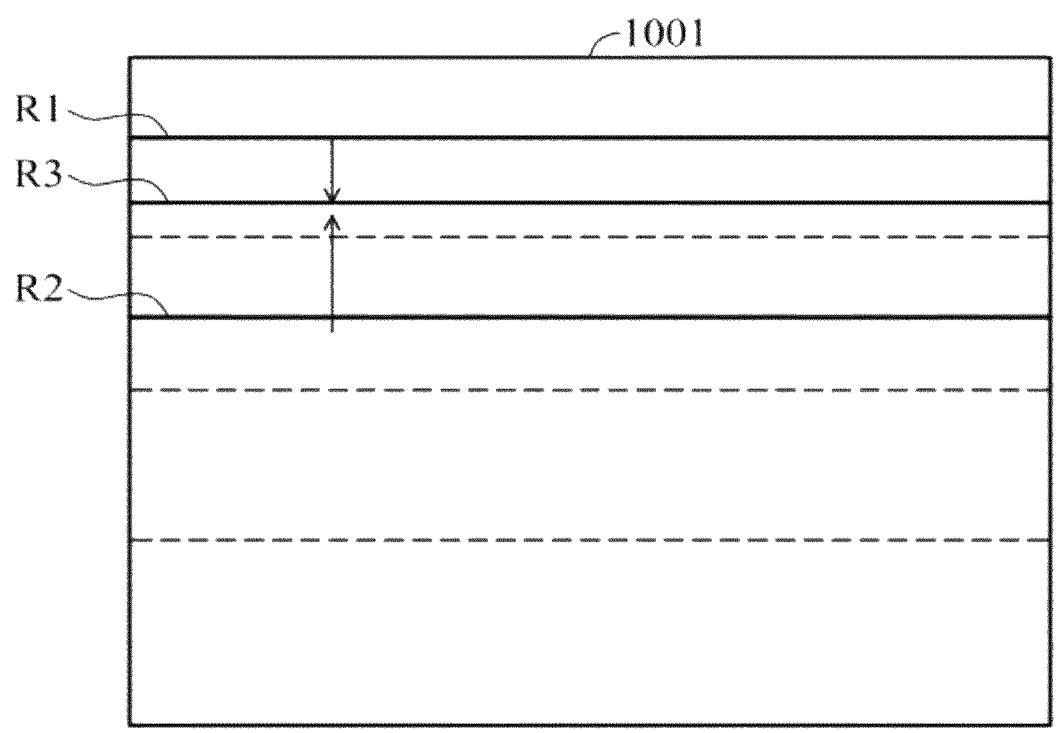
FIG. 11 illustrates the concept of blending the local tone mapping curve for each row of pixels of the input image according to an embodiment of the invention.

FIG. 11 illustrates the concept of blending the local tone mapping curve for each row of pixels of the input image $S_{IM}$ according to an embodiment of the invention. As shown in FIG. 11, the image 1001 is divided into four image partitions. The blender 105 may obtain a tone mapping curve for the row of pixels R3 by blending the local tone mapping curve of the first image partition having the row of pixels R3 and the local tone mapping curve of the second image partitions according to a distance from the row of pixels R3 to a central row of pixels R1 in the first image partition and the distance from the row of pixels R3 to the central row of pixels R2 of the second image partition. Note that the local tone mapping curve for each image partition may be regarded as the dedicated tone mapping curve of the central row of pixels in the corresponding image partition. After obtaining the dedicated tone mapping curve for each row of pixels in the image partitions, the gamma voltage calculator 103 may further obtain the plurality of reference gamma voltages for each row of pixels according to the corresponding tone mapping curve for that row of pixels as previously described.

Figure 12:
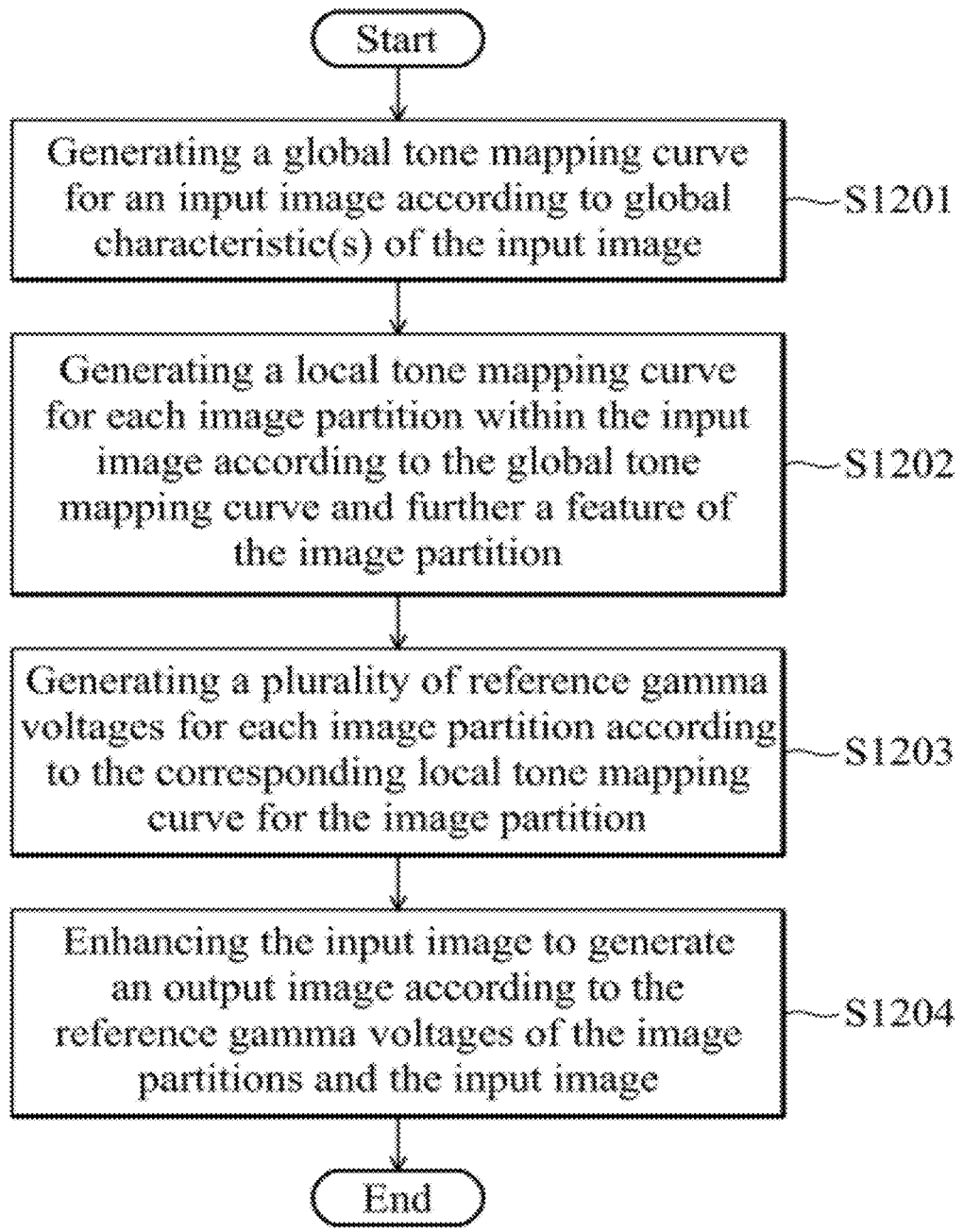
FIG. 12 shows a flow chart of an image enhancement method according to an embodiment of the invention.

FIG. 12 shows a flow chart of an image processing method according to an embodiment of the invention. Firstly, a global tone mapping curve for an input image is generated according to global characteristic(s) of the input image (Step S1201). Next, a local tone mapping curve for each image partition within the input image is generated according to the global tone mapping curve and to a feature of the image partition (Step S1202). Next, a plurality of reference gamma voltages for each image partition are generated according to the corresponding local tone mapping curve for the image partition (Step S1203). Finally, the input image is enhanced to generate an output image according to the reference gamma voltages of the image partitions and the input image (Step S1204).

Figure 13A:
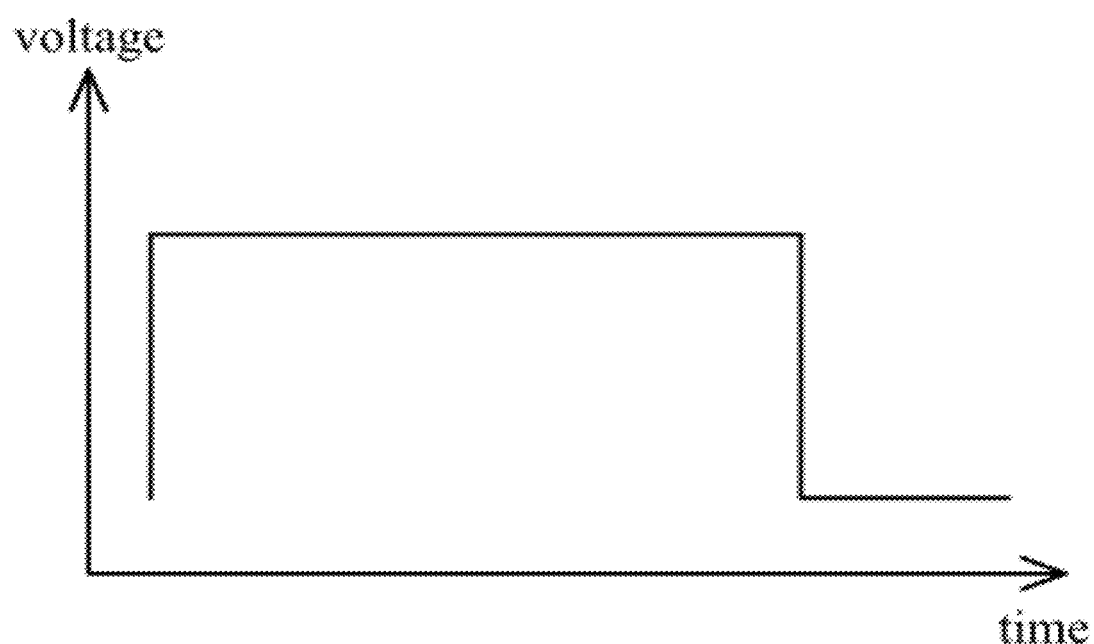
FIGS. 13a-13d shows four local backlight duty cycle curves according to another embodiment of the invention.
Figure 13B:
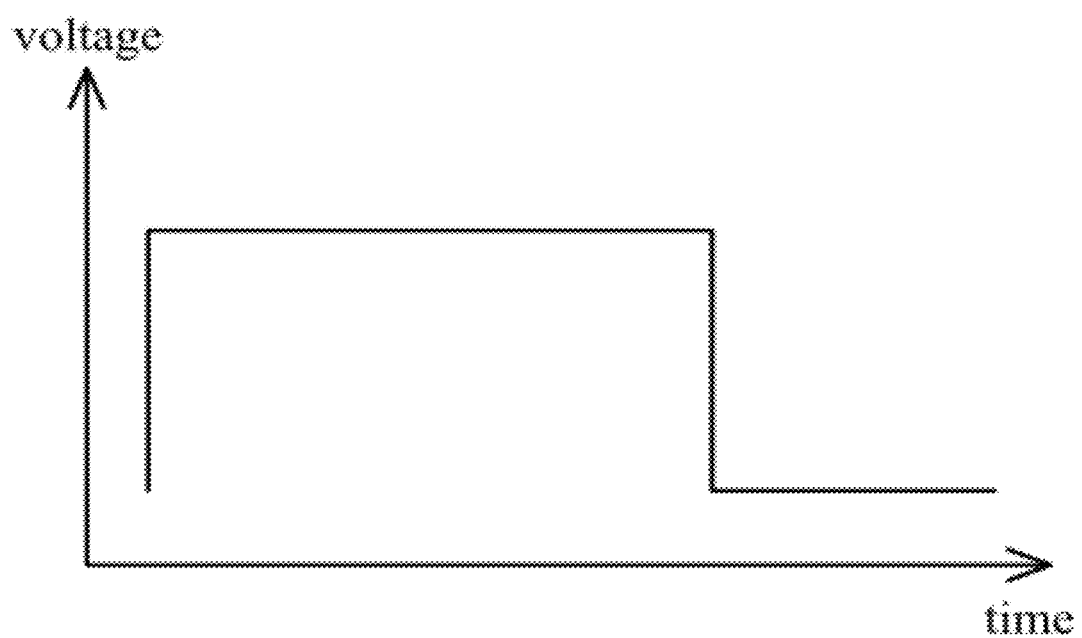
Figure 13C:
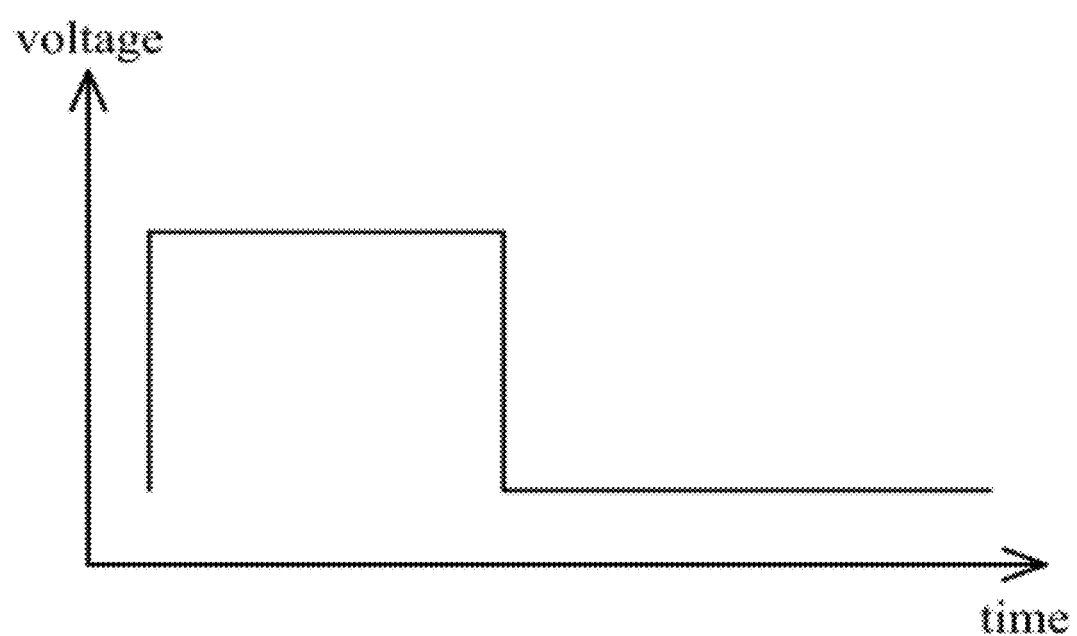
Figure 13D:
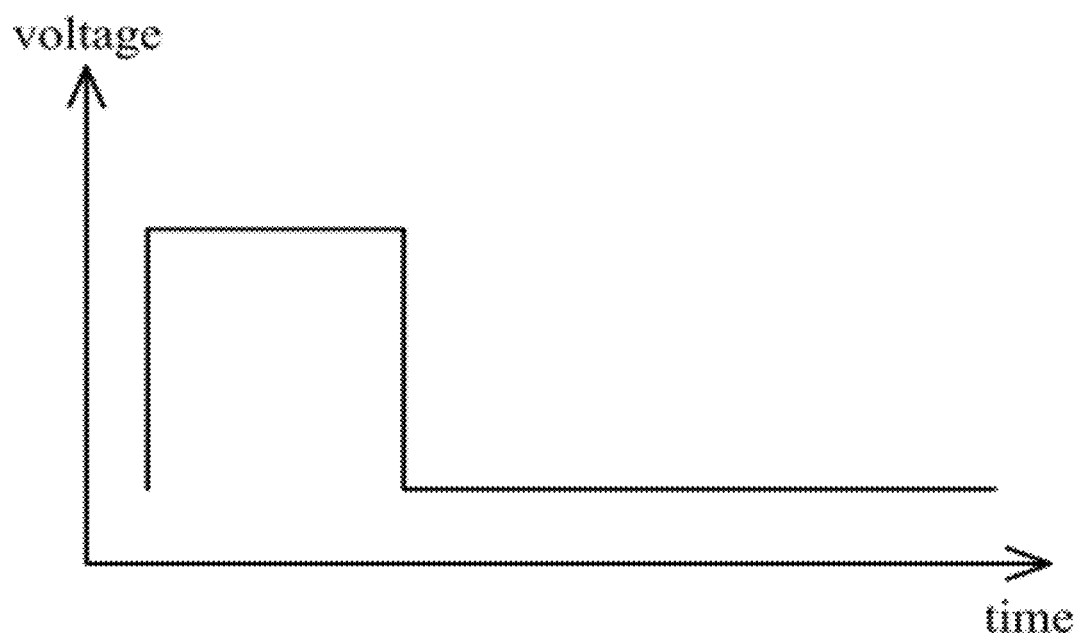

According to yet another embodiment of the invention, the backlight of the panel for different image partitions may further be independently controlled and adjusted according to different backlight duty cycles. Since the local backlight duty cycle curves may be obtained in the similar manner according to the global backlight duty cycle and the features of the image partitions, for example, the local backlight duty cycle curves may be obtained by adjusting the length of the global backlight duty cycle according to the average brightness of the image partition, the backlight for different image partitions may be independently controlled and adjusted according to the local backlight duty cycle curves. FIG. 13a-13d shows four local backlight duty cycle curves according to another embodiment of the invention. FIG. 13a shows the local backlight duty cycle curve of the first image partition of the input image. FIG. 13b shows the local backlight duty cycle curve of the second image partition of the input image. FIG. 13c shows the local backlight duty cycle curve of the third image partition of the input image. FIG. 13d shows the local backlight duty cycle curve of the fourth image partition of the input image. As shown in FIGS. 13c and 13d, since the average brightness of the image partitions in the lower half (i.e. the third and fourth image partitions) of the input image is smaller than that of the image partitions in the upper half of the input image, the backlight duty cycles of the image partitions in the lower half are shorter than that of the image partitions in the upper half. In contrast to the global backlight adjustment, the independently local backlight adjustment may be more power efficient. In addition, once the local backlight duty cycle curves are obtained, the local tone mapping curves for different image partitions may also be obtained by using the one to one mapping relationship as previously described.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image enhancement apparatus, comprising:
    a global tone mapping curve generator generating a global tone mapping curve for an input image according to global characteristic(s) of the input image;
    a local tone mapping curve generator generating a local tone mapping curve for each image partition within the input image according to the global tone mapping curve and further a feature of the image partition;
    a reference gamma voltage generator generating a plurality of reference gamma voltages for each image partition according to the corresponding local tone mapping curve for the image partition; and
    an image generator generating an output image according to the reference gamma voltages of the image partitions and the input image.

2. The image enhancement apparatus as claimed in claim 1, wherein the global tone mapping curve generator further comprises:
    a global characteristic analyzer analyzing the input image to obtain the global characteristic(s).

3. The image processing apparatus as claimed in claim 1, wherein the local tone mapping curve generator further comprises:
    an image divider dividing the input image into a plurality of image partitions; and
    a local characteristic analyzer calculating the feature of each image partition by filtering the image partition.

4. The image enhancement apparatus as claimed in claim 3, wherein the image divider divides the input image along a direction of a row of pixels of the input image.

5. The image enhancement apparatus as claimed in claim 3, wherein the local characteristic analyzer filters the image partition to generate a filtered partition and outputs the sum of pixels in the filtered partition as the feature of the image partition.

6. The image enhancement apparatus as claimed in claim 1, wherein the local tone mapping curve generator generates the local tone mapping curve for the image partition by adjusting a curvature of the global tone mapping curve according to the feature of the image partition.

7. The image enhancement apparatus as claimed in claim 1, wherein the reference gamma voltage generator further comprises:
   a gamma voltage calculator obtaining the plurality of reference gamma voltages for each image partition according to the corresponding local tone mapping curve for the image partition; and
   a programmable D/A converter converting the plurality of reference gamma voltages to a plurality of analog reference gamma voltages represented in an analog manner.

8. The image enhancement apparatus as claimed in claim 7, wherein the gamma voltage calculator transfers a plurality of original reference gamma voltages to the plurality of reference gamma voltages for each image partition according to the corresponding local tone mapping curve for the image partition.

9. The image enhancement apparatus as claimed in claim 7, further comprising:
   a blender obtaining a tone mapping curve for each row of pixels of the input image by blending the local tone mapping curve of the image partition having the row of pixels and the local tone mapping curve(s) of one or more adjacent image partitions according to a distance from the row of pixels to a central row of pixels in the image partition and the distance(s) from the row of pixels to central row(s) of pixels of the one or more adjacent image partitions,
   wherein the gamma voltage calculator further obtains the plurality of reference gamma voltages for each row of pixels according to the corresponding tone mapping curve for that row of pixels.

10. The image enhancement apparatus as claimed in claim 7, wherein the image generator further interpolates the plurality of analog reference gamma voltages in analog domain to obtain a pixel value versus gamma voltage curve for each image partition and generates the output image according to the pixel value versus gamma voltage curve of the image partitions and the input image.

11. An image enhancement method executed by a processor, comprising:
   generating by the processor a global tone mapping curve for an input image according to global characteristic(s) of the input image;
   generating by the processor a local tone mapping curve for each image partition within the input image according to the global tone mapping curve and further a feature of the image partition;
   generating by the processor a plurality of reference gamma voltages for each image partition according to the corresponding local tone mapping curve for the image partition; and
   generating by the processor an output image according to the reference gamma voltages of the image partitions and the input image.

12. The image enhancement method as claimed in claim 11, wherein the feature of the image partition is generated by the steps:
   dividing by the processor the input image into a plurality of image partitions along a direction of row of pixels of the input image; and
   calculating by the processor the feature of the image partition by filtering the image partition.

13. The image enhancement method as claimed in claim 12, wherein the step of calculating the feature of the image partition by filtering the image partition comprises:
   filtering by the processor the image partition to generate a filtered partition; and
   outputting by the processor the sum of pixels in the filtered partition as the feature of the image partition.

14. The image enhancement method as claimed in claim 11, wherein the local tone mapping curve for the image partition is generated by adjusting a curvature of the global tone mapping curve according to the feature of the image partition.

15. The image enhancement method as claimed in claim 11, wherein the step of generating a plurality of reference gamma voltages comprises:
   obtaining by the processor the plurality of reference gamma voltages for each image partition according to the corresponding local tone mapping curve for the image partition; and
   converting the plurality of reference gamma voltages to a plurality of analog reference gamma voltages represented in an analog manner by the processor.

16. The image enhancement method as claimed in claim 15, wherein the step of obtaining the plurality of reference gamma voltages comprises:
   transferring by the processor a plurality of original reference gamma voltages to the plurality of reference gamma voltages for each image partition according to the corresponding local tone mapping curve for the image partition.

17. The image enhancement method as claimed in claim 15, wherein the step of enhancing the input image further comprises:
   obtaining by the processor a corresponding gamma voltage for each pixel in the image partitions by interpolating the plurality of analog reference gamma voltages in analog domain; and
   generating by the processor the output image according to the corresponding gamma voltage for each pixel.

18. The image enhancement method as claimed in claim 11, wherein the step of enhancing the input image further comprises:
   independently enhancing by the processor contrast for each image partition according to the reference gamma voltages of the corresponding image partition and the input image.

19. The image enhancement method as claimed in claim 11, wherein the step of enhancing the input image further comprises:
   independently adjusting by the processor the backlight of a panel displaying the output image for each image partition according to the local tone mapping curve of the corresponding image partition.

* * * * *